Figure 1:
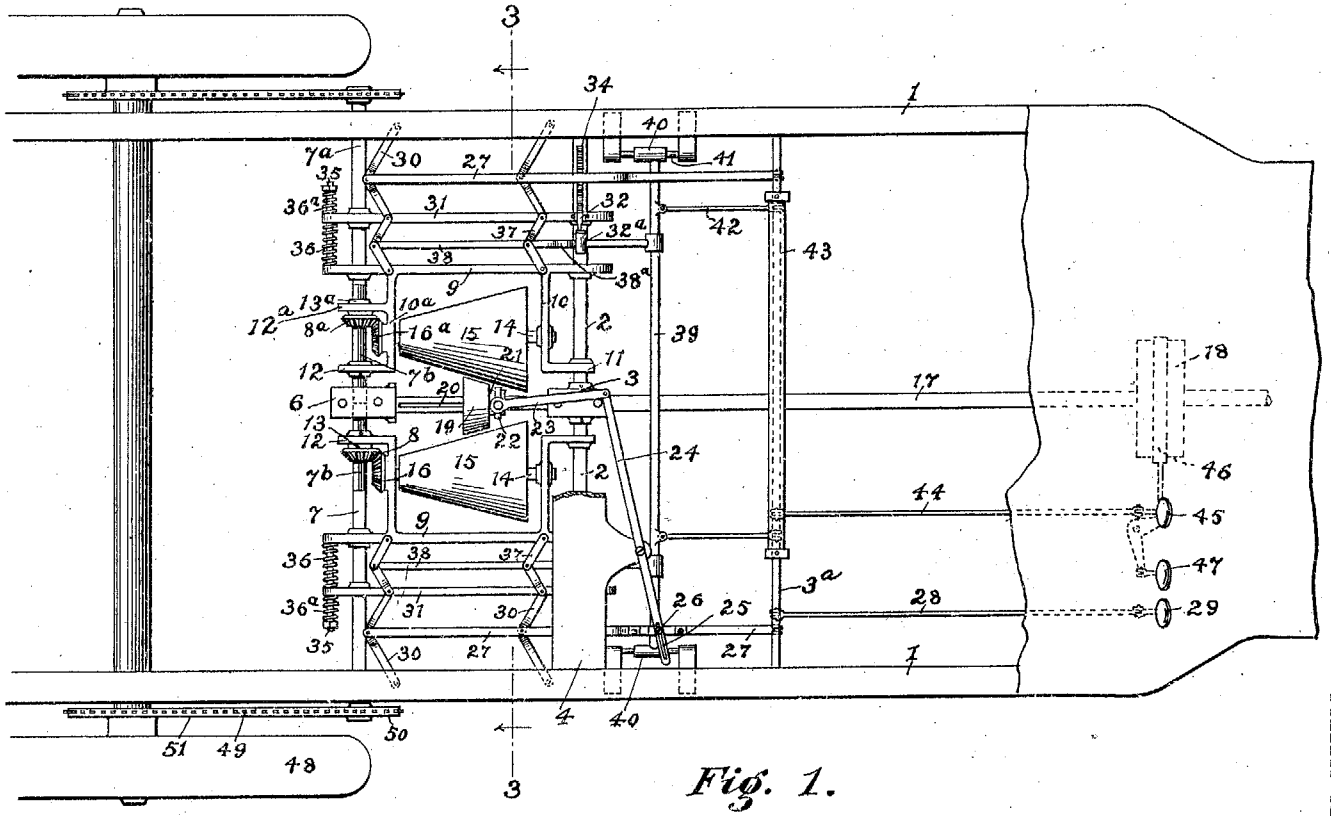

J. F. WAITE.

DRIVING MECHANISM FOR VEHICLES.

APPLICATION FILED FEB. 16, 1910.

Reissued May 10, 1910.

13,113.

2 SHEETS—SHEET 1.

Witnesses:

Brennan B. West.

Oliver M. Kappler.

Inventor:

James F. Waite,

By Bates, Fouts & Hull

Attys.

J. F. WAITE.

DRIVING MECHANISM FOR VEHICLES.

APPLICATION FILED FEB. 16, 1910.

Reissued May 10, 1910.

13,113.

2 SHEETS—SHEET 2.

Witnesses:

Brennan B. West.

Oliver M. Kappler.

Inventor:

James F. Waite,

By Bates, Fouts & Hull.

Attys.

UNITED STATES PATENT OFFICE.

JAMES F. WAITE, OF CLEVELAND, OHIO.

DRIVING MECHANISM FOR VEHICLES.

13,113. Specification of Reissued Letters Patent. Reissued May 10, 1910.

Original No. 948,749, dated February 8, 1910, Serial No. 512,966. Application for reissue filed February 16, 1910. Serial No. 544,324.

*To all whom it may concern:*

Be it known that I, JAMES F. WAITE, a citizen of the United States, residing at Cleveland, in the county of Cuyahoga and State of Ohio, have invented a certain new and useful Improvement in Driving Mechanism for Vehicles, &c., of which the following is a full, clear, and exact description, reference being had to the accompanying drawings.

This invention relates to driving mechanism, and more particularly to driving mechanism for automobiles.

It has for its objects to provide such mechanism of the friction type, which is comparatively inexpensive of construction, but which is capable of a wide range of adjustment for the purpose of varying the speed and is so designed as to permit the driving and driven parts to be brought into engagement with a minimum amount of shock or jar.

The invention comprises a pair of tapered driven members, preferably cones, each operatively connected with a shaft section, a driving member, which is preferably a tapered disk, interposed between said driven members and adapted to engage the same simultaneously, with means whereby the distance between the driven members may be automatically varied to accommodate the driving member therebetween in its various speed adjusted positions and means for thereafter bringing the driving and driven members into and out of engagement.

The invention also comprises certain details of construction which will be pointed out hereinafter.

Generally speaking, the invention may be defined as consisting of the combinations of elements embodied in the claims hereto annexed and illustrated in the drawings forming a part hereof, wherein—

Figure 2:
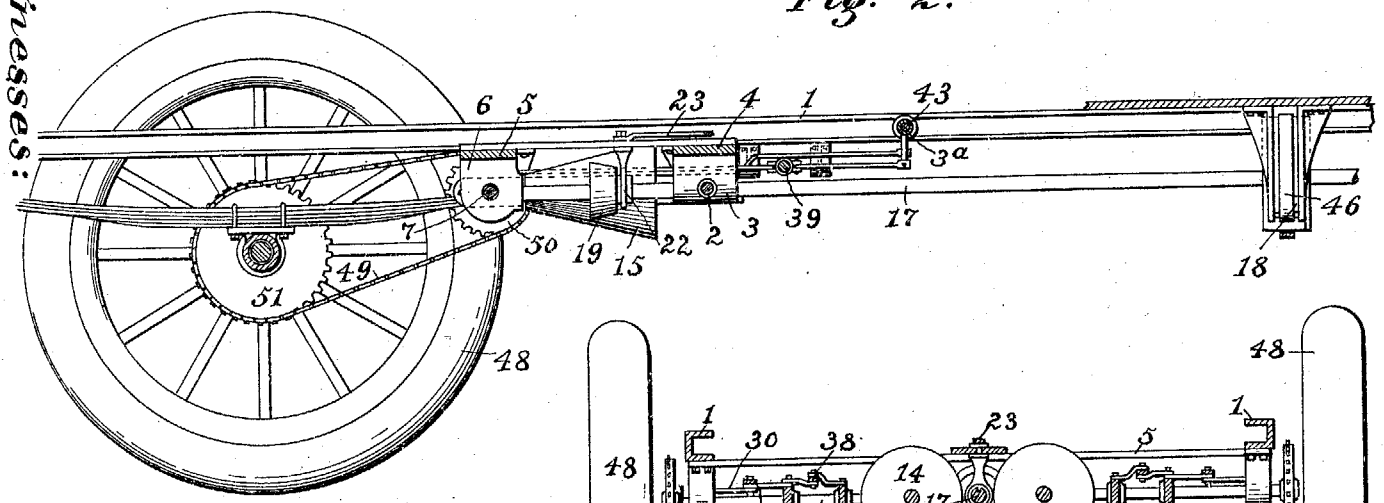
Figure 3:
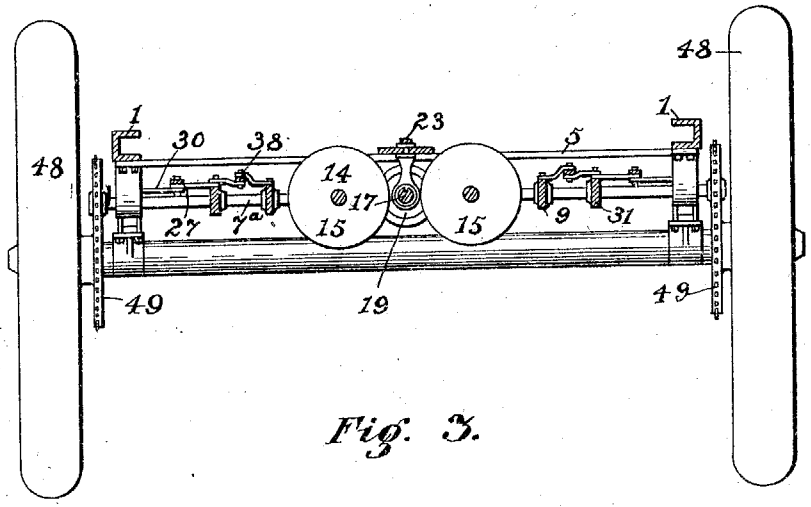
Figure 4:
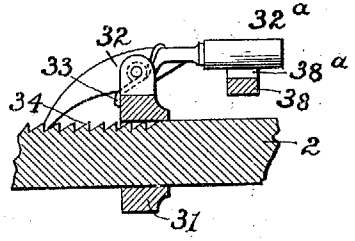

Figure 1 represents a plan view of a portion of the frame of an automobile having my invention applied thereto, certain parts being broken away; Fig. 2 represents a longitudinal sectional view through the construction shown in the preceding figure; Fig. 3 represents a sectional view corresponding to the line 3—3 of Fig. 1, the driven members or cones being shown in elevation, and Fig. 4 represents a sectional detail of the pawl-and-ratchet connection between the vehicle frame and one of the cone-operating links.

Describing the parts by reference characters, 1 denotes the side frames of an automobile, 2 a rod extending between the side frames and being conveniently supported by hangers 3 depending from a cross plate 4 which extends between said side frames. Three such hangers are provided, one at each end of the cross plate and one at the center. The central hanger provides a support for the central portion of the rod 2.

5 denotes a cross plate, similar to 4, which extends beneath the side frames 1 and is supported therefrom. This plate is provided with a central hanger 6, which may be supported therefrom in any convenient manner and forms journal bearings for the inner ends of the shaft sections 7, $7^a$, the outer ends of said sections being supported in similar bearings (not shown) depending from the side frames and conveniently carried by the cross plate 5. The shaft sections 7—$7^a$ are squared at their inner portions as shown at $7^b$, for the reception of bevel gears 8, $8^a$ which are slidably mounted on the squared portions of said shaft sections. The details of construction whereby the bevel gears 8—$8^a$ may be adjusted along their respective shaft sections will be described in connection with the members by means of which said gears are driven.

9 denotes frame members of substantially identical construction which are slidably sleeved upon the rod 2 and the rounded part of each shaft section 7—$7^a$. Each member 9 is provided with a pair of arms 10, $10^a$ projecting inwardly toward the central portion of the vehicle frame. At their inner ends the arms 10 and $10^a$ are bent at right angles, substantially parallel with the member 9, as shown at 11 and 12. The arms 11 are slidably mounted upon the rod 2, and one of the arms 12 is provided with a bearing 13 for the neck of a gear 8. The arms 10 and $10^a$ are each provided with a journal for the shaft 14 of a driven member 15, which is preferably a cone. The ends of the shafts which project through the arms $10^a$ are provided each with a beveled gear 16, $16^a$ meshing with the gears 8, $8^a$, respectively. As will be seen by reference to Fig. 1, one of said arms $10^a$ is provided with an extra arm $12^a$ projecting parallel with the arm 12 and said arm $12^a$ is provided with a bearing $13^a$ for the neck of the gear $8^a$, the gear $8^a$ being located between the gear $16^a$ and the adjacent side frame 1. The frames comprising the arms 10, $10^a$, 12 and $12^a$ form yokes or brackets for holding the gears 16 and $16^a$ in mesh with the gears 8, $8^a$.

17 denotes a shaft which may be conveniently driven through a planetary gear of ordinary construction, the casing of which is shown at 18. The rear end of this shaft is journaled in the hanger 6 and said shaft is provided with a driving member 19. This member is frusto-conical in shape and is tapered reversely with respect to the inclination of the members 15. The shaft 17 extends between the driven members 15, with its axis in the same plane as the axes of said members. The gear 19 is slidable on shaft 17, said shaft having a long key-way 20 by means of which driving connection may be maintained between the shaft and the gear 19 while leaving the latter free to be adjusted along said shaft.

The gear 19 is provided with a collar 21 which receives a yoke 22, said yoke being connected by a link 23 with a lever 24, which may be conveniently pivoted to the cross plate 4. The outer end of lever 24 is slotted, as shown at 25, and is connected by means of a pin 26 with an operating rod 27, the front end of which is connected to the rock shaft $3^a$, said rock shaft being operated through a link 28 connected to the foot lever 29. The rear end of the rod 27 has connected thereto the joints of toggle levers 30. The outer ends of said levers are pivotally supported from the side frame, as by any suitable hangers (not shown). The inner ends are pivoted to an intermediate member 31 which is sleeved upon the rounded portion of shaft sections 7, $7^a$ and upon the rod 2. The connection of rock shaft $3^a$ with rod 27, toggles 30 and sliding member 31 is duplicated on the other side of the frame.

Each sliding member 31 is provided near one end with a pawl 32, said pawl being provided with a spring 33 which normally holds it out of contact with a rack 34 carried by or formed upon the rod 2. The purpose of this construction will be explained hereinafter. A rod 35 extends through the rear end of the sliding member 31 and is connected to the member 9. Spiral springs 36, $36^a$ are applied to said rod on each side of the member 31.

By the construction described, the movement of the lever 29 in a direction to increase the speed by moving the driving member 19 rearwardly along the shaft 17 causes the driven members 15 to simultaneously approach each other, through the action of the rods 27 on the toggles 30, the members 9 and 31 being connected by toggle levers 37 which, when this action occurs, forms a rigid connection between members 31 and 9 and between the former member and the frames which carry the driven members. The springs 36 and $36^a$ are located on opposite sides of the sliding members 31 and tend to maintain a proper relation between said members 31 and the frame members 9. The parts will be so proportioned that a fixed distance (just sufficient for clearance) will be provided between the driven members 15 and the driving member 19 while the latter is being adjusted to determine the speed at which the vehicle shall be driven. The movement of the lever 29 in the reverse direction bends the toggles 30 and pulls apart the frames carrying the driven members, through the toggles 37, the joints of said toggles being rigidly connected at this time by the rods 38.

To bring the driven members 15 and the driving member 19 into driving engagement, I show the following construction:—The rods 38 are connected to a rod 39 the opposite ends of which are provided each with a sleeve 40 mounted upon a rod 41. The rod 39 is connected by means of links 42 with a hollow rock shaft 43, which may conveniently surround the shaft $3^a$. Rock shaft 43 is connected by means of a rod 44 with the foot-lever 45. After the driving member 19 has been adjusted to secure the proper speed, the lever 45 is operated to straighten the toggles 37, thus throwing the members 15 into engagement with the driving gear or member 19. By this construction, practically all shock is avoided in bringing the driving and driven members into engagement.

Attention has been called to the pawls 32. The purpose of these pawls is to take care of the outward thrust brought upon the members 31 by straightening the toggles 37. Each rod 38 is provided with a cam $38^a$ thereon which is adapted to engage the handle $32^a$ of a pawl as the toggles are straightened and cause the pawl to engage the ratchet teeth 34. When the lever 45 is moved in a direction to bend the toggles 37, the pawl 32 is thrown out of engagement with its rack by the spring 33 and the spring 36 assists in the separation of the members 9 and 31.

The planetary-gear casing 18 is provided with a brake band, shown at 46, and this band is suitably connected to the foot lever 47, the purpose of this construction being to enable a reversal to be obtained, as is well understood in this art.

The outer ends of the shaft sections 7, $7^a$ are shown as having each a driving connection with the rear wheels 48, as through a chain 49 and sprockets 50, 51. It will be understood, however, that my driving mechanism may be applied to axle sections carrying the drive wheels, if desired, without altering the principle of my invention.

Having thus described my invention, what I claim is:

1. In driving mechanism, the combination of a pair of shaft sections, tapered members operatively connected therewith, a member common to both of the former members and interposed therebetween, means for moving the latter member longitudinally with respect to the former members, means for automatically maintaining a fixed distance between the latter member and the former members during such movement, and means for thereafter bringing said members into and out of engagement.

2. In driving mechanism, the combination of a pair of shaft sections, tapered driven members operatively connected therewith, a driving member common to both of said driven members and interposed therebetween, means for moving the driving member longitudinally with respect to the driven members, means for automatically maintaining a fixed distance between the driving and driven members during such movement, and means for thereafter bringing said members into and out of engagement.

3. In a driving mechanism, the combination of a pair of shaft sections, a conical driven member operatively connected with each section, a reversely tapered driving member interposed between said driven members, means for moving the latter member longitudinally of the former members, connections whereby such movement of the latter member will operate the former members to preserve a fixed distance between the driving and driven members, and means whereby the driven members may be brought into and out of driving engagement with the driving member.

4. In driving mechanism, the combination of a pair of shaft sections, a conical member operatively connected with each section, a reversely tapered member interposed between the former members, means for obtaining movement between the former members and the latter member in a direction which is longitudinal with respect to the former members, connections whereby such movement will preserve a fixed distance between the former and latter members, and means whereby said members may be brought into and out of driving engagement.

5. In a driving mechanism, the combination of a pair of shaft sections, a pinion connected to each of said sections and slidable thereon, a pair of tapered driven members each having a driving connection with a pinion on one of the shaft sections, a frame for each of said driven members and a pinion, a driving member interposed between the driven members and tapered reversely with respect thereto, means for moving the latter member longitudinally with respect to the former members, connections whereby the movement of the driving member will operate the frames to preserve a substantially fixed distance between the driving and driven members, and means whereby said frames may be operated independently of the former means to bring the driving and driven members into and out of engagement.

6. In a driving mechanism, the combination of a pair of shaft sections, a pinion connected to each of said sections and slidable thereon, a pair of tapered driven members each having a pinion meshing with a pinion on one of the shaft sections, a frame for each driven member and for the pinion driven thereby and a coöperating shaft pinion, a driving member interposed between the driven members and tapered reversely with respect thereto, means for moving the latter member longitudinally with respect to the former members, connections whereby the operation of said means will operate the frames to preserve a substantially fixed distance between the driving and driven members, and means whereby said frames may be operated independently of the former means, to bring the driving and driven members into engagement.

7. In a driving mechanism, the combination of a shaft, a tapered member operatively connected with said shaft, a driving member tapered reversely with respect to the former member, means for moving the latter member longitudinally with respect to the former member, connections whereby such movement will move the former member toward and away from the latter member to preserve a substantially fixed distance therebetween while preserving a driving engagement between the former member and the shaft and means for bringing said members into and out of driving engagement.

8. In a driving mechanism, the combination of a shaft, a tapered member operatively connected to said shaft, a member tapered reversely with respect to the former member, means for obtaining a movement between said members in a direction which is longitudinal with respect to the former member, connections whereby such movement will preserve a substantially fixed distance between said members and means for bringing said members into and out of driving engagement.

9. In a driving mechanism, the combination of a shaft, a pinion thereon adapted to be moved longitudinally thereof, a tapered driven member, a driving pinion operated by said member, a frame holding said pinions in mesh and supporting the driven member, a driving member which is reversely tapered with respect to the driven member, means for moving said driving member longitudinally with respect to the former member, connections whereby such movement of the driving member will move said frame to maintain a substantially fixed distance between the driving and driven members, and means for thereafter moving said frame to bring said members into and out of driving engagement.

10. In a driving mechanism for vehicles, the combination of a shaft, a rod extending substantially parallel with said shaft, an arm slidably mounted on said rod and shaft, a pinion carried by said arm and slidably mounted on the shaft, a driving pinion for the latter pinion, a shaft for the driving pinion carried by said frame, a tapered driven member mounted on said shaft, a driving member, means for moving the same substantially parallel with the axis of the former member, connections whereby such movement will operate the frame to preserve a substantially fixed distance between said members, and means whereby said frame may be moved toward and from the driving member.

11. In a driving mechanism for vehicles, the combination of a pair of shaft sections, a frame for each section, a pinion carried by each frame and having a sliding driving engagement with a shaft section, a tapered driven member carried by each frame and each operatively connected with a pinion, a reversely tapered driving member interposed between the former members, means for moving the same in the plane of the axes of the former members, connections whereby such movement will operate the frames to preserve a substantially fixed distance between the driving and driven members, and means for moving said frames to bring the driving and driven members into and out of engagement.

12. In a driving mechanism, the combination of a shaft, a tapered driven member arranged to rotate said shaft, a driving member for the former member, means for producing relative movement between said members in the direction of the axis of the driven member, connections whereby a substantially fixed distance will be preserved between the driving portions of said members during such movement, and means whereby said members may be brought into and out of engagement.

13. In a driving mechanism for vehicles, the combination of a pair of shaft sections, a pair of tapered driven members having their axes extending at substantially right angles with respect to the shaft sections, a drive shaft extending between the driven members in substantially the same plane as the axes thereof, a driving member slidably mounted on said drive shaft, means for moving the driving member along said drive shaft, connections whereby such movement will move the driven members toward and away from the driving member to preserve a substantially fixed distance therebetween, and means for bringing the driven members into and out of engagement with the driving member.

14. In a driving mechanism for vehicles, the combination of a pair of shaft sections, a pair of tapered driven members having their axes extending at substantially right angles with respect to the shaft sections, a drive shaft extending between the driven members in substantially the same plane as the axes thereof, a driving member slidably mounted on said drive shaft, the latter member being tapered reversely with respect to the former members, means for moving the driving member along said drive shaft, connections whereby such movement will move the driven members toward and away from the driving member to preserve a substantially fixed distance therebetween, and means for bringing the driven members into and out of engagement with the driving member.

15. In a driving mechanism for vehicles, the combination, with a pair of shaft sections, of a pinion in driving engagement with each section and slidably mounted thereon, a pair of frames, a driven member carried by each frame and adapted to drive a pinion on one of the shaft sections, a driving member interposed between the driven members, means connected with the driving member and adapted to move the same longitudinally with respect to and between the driven members, toggle levers operatively connected to said frames, and means for operating said levers.

16. In a driving mechanism for vehicles, the combination, with a pair of shaft sections, of a pinion in driving engagement with each section and slidably mounted thereon, a pair of frames, a tapered driven member carried by each frame and adapted to drive a pinion on one of the shaft sections, a reversely tapered driving member interposed between the driven members, a lever connected with the driving member and adapted to move the same longitudinally with respect to and between the driven members, toggle levers operatively connected to said frames, and means for operating said toggle levers.

17. In a driving mechanism for vehicles, the combination of a pair of shaft sections, a driven member for each section having a driving connection therewith, a frame supporting each of said driven members, said frames being movable toward and from each other, a driving member interposed between the driven members and movable in the plane of the axis thereof and longitudinally with respect to the former members, means for so moving the driving member, toggles connected with said frames, and rods, operatively connected with said toggles and with the aforesaid means, for moving the frames toward and from each other, and additional means for moving said frames toward and from each other, the latter means being operative independently of the former.

18. In a driving mechanism for vehicles, the combination of a pair of shaft sections, a tapered driven member for each section having a driving connection therewith, a frame supporting each of said driven members, said frames being movable toward and from each other, a reversely tapered driving member interposed between the driven members and movable in the plane of the axis thereof and longitudinally with respect to the former members, means for so moving the driving member, toggles connected with said frames, means operatively connected with said toggles and with the aforesaid means for moving the frames toward and from each other, and additional means for moving said frames toward and from each other, the latter means being operative independently of the former.

19. In a driving mechanism, the combination of a shaft, a tapered driven member arranged to rotate said shaft, a driving member for the driven member and tapered reversely with respect to said driven member, means for producing relative movement between said members in the direction of the axis of the driven member, connections whereby a substantially fixed distance will be preserved between the driving portions of said members during such movement, and means whereby said members may be brought into and out of engagement.

20. In a driving mechanism, the combination of a pair of shaft sections, a tapered driven member arranged to rotate each shaft section, a driving member for the former members, means for producing relative movement between the driving and driven members in the direction of the axes of the driven members, connections whereby a substantially fixed distance will be preserved between the driving portions of the driving and driven members during such movement, and means whereby the driving and driven members may be brought into and out of engagement.

21. In a driving mechanism, the combination of a pair of shaft sections, a tapered member operatively connected with each section, a member interposed between the former members, means for producing relative movement between the former members and the latter member in the direction of the axes of the former members, connections whereby a substantially fixed distance will be preserved between the tapered members and the interposed member during such movement, and means whereby the tapered members and the interposed member may be brought into and out of engagement.

In testimony whereof, I hereunto affix my signature in the presence of two witnesses.

JAMES F. WAITE.

Witnesses:

J. B. HULL,

BRENNAN B. WEST.